April 23, 1957   H. KÖHLER ET AL   2,789,463
FOCAL LENS SYSTEM FOR ATTACHING TO PHOTOGRAPHIC OBJECTIVES
Filed Oct. 3, 1955
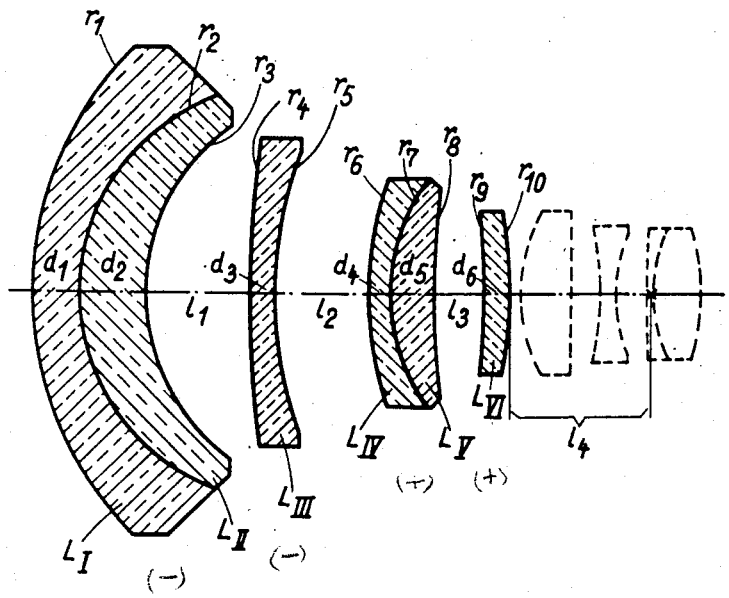

United States Patent Office 2,789,463
Patented Apr. 23, 1957

2,789,463
FOCAL LENS SYSTEM FOR ATTACHING TO PHOTOGRAPHIC OBJECTIVES

Horst Köhler, Heidenheim (Brenz), Robert Richter, Aalen, and Helmut Kaselitz, Konigsbronn, Germany, assignors to Carl Zeiss, Heidenheim (Brenz), Wurttemberg, Germany Application October 3, 1955, Serial No. 538,218

Claims priority, application Germany October 2, 1954

3 Claims. (Cl. 88—57)

The present invention concerns an afocal lens system for attaching to photographic objectives with a telescope magnification reckoned in the direction of the light smaller than unity with a dispersive front and a collective rear lens group. Such attachment systems serve to shorten the focal lengths of existing photographic objectives in proportion to the telescope magnification. Attachment systems of this kind are known. The present invention effects an improvement in these known systems. Object of the invention is an attachment lens system of this kind in which the front as well as the rear lens group consist each of two components separated by an air space and all components are menisci wherein the components of the front dispersive lens group and the first component of the collective rear lens group turn their convex sides towards the object while the posterior component of the rear collective lens group turns its convex side towards the image and that finally the first component of each of the two lens groups consists of two lenses of opposite refractive powers cemented to each other while the second component of each of the two lens groups is a free-standing single lens.

In order to achieve that the Petzval part-sums of the two lens groups cancel each other and that the individual lens groups taken singly are nearly achromatized and in order furthermore to keep the values for the maximum curvatures within tolerable limits it is a further subject of the invention that at least one dispersive lens in the front dispersive lens group and at least one collective lens in the collective rear lens group is made from a glass whose refractive index is greater than 1.6 and whose Abbe number is greater than 50 wherein furthermore the difference of the refractive indices in the two lenses cemented to each other in each lens group is larger than 0.02.

As trigonometrical ray tracing has shown it is an advantage for keeping distortion, astigmatism and coma small if according to the invention the two cemented surfaces turn their convex sides towards the objective and their radii are greater than 0.2 times but smaller than 0.6 times the focal length of the lens group to which they belong.

Also it has been shown an advantage if the following values are provided according to a further development of the invention for the front radii of the individual components: first component of the front lens group: greater than 0.5 times but smaller than 0.9 times the focal length of the front lens group; second component of the front lens group: greater than 1.8 times but smaller than 3 times the focal length of the front lens group; first component of the rear lens group: greater than 0.4 times but smaller than 0.7 times the focal length of the rear lens group; rear component of the rear lens group: greater than the unit value but smaller than 1.8 times the focal length of the rear lens group.

In the following illustration of the figure of the drawing an embodiment of the attachment lens system according to the invention is represented in section and in the table given in the following, numerical values are listed for this embodiment. It contains an front dispersive lens group consisting of the lenses $L_I$ and $L_{II}$ cemented to each other as well as of a single lens $L_{III}$ and a rear collective lens group consisting of the lenses $L_{IV}$ and $L_V$ cemented to each other as well as of the single lens $L_{VI}$.

In the illustration and in the table there are designated

By $L$ the individual lenses
By $r$ the radii
By $d$ the thicknesses, and
By $l$ the air spaces The values of the table correspond to a constructed or made embodiment with a telescope magnification of 0.8; they are referred to a $f'=1$ of the front lens group. This embodiment of an attachment lens system is a further embodiment of the invention with the numerical values of the following table of which the surface refractive powers $(n/r)$ each deviate at most by $\pm 0.5/f'$, and of which the thicknesses and separations each deviate at most by $\pm 0.05 \cdot f'$ from the values taken from the following table.

The individual focal length of the front dispersive lens group amounts in the embodiment made to $f'=-50.44$ mm., the individual focal length of the rear collective lens group amounts to $f''=+62.71$ mm. The photographic objective placed behind the attachment lens system according to the invention and drawn in dotted lines in the illustration is an objective of a focal length of 45 mm.

EMBODIMENT

| Lenses | Radii | Thicknesses and Separations | $n_d$ | $\nu_d$ |
|---|---|---|---|---|
| $L_I$ | $r_1=+0.688422$ | $d_1=0.09358$ | 1.65160 | 58.4 |
| $L_{II}$ | $r_2=+0.413025$ | $d_2=0.12966$ | 1.59270 | 35.4 |
|  | $r_3=+0.401308$ | $l_1=0.20103$ |  |  |
| $L_{III}$ | $r_4=+2.305908$ | $d_3=0.05036$ | 1.62041 | 60.3 |
|  | $r_5=+0.789274$ | $l_2=0.18200$ |  |  |
|  | $r_6=+0.673711$ |  |  |  |
| $L_{IV}$ | $r_7=+0.378866$ | $d_4=0.03846$ | 1.60717 | 40.2 |
| $L_V$ | $r_8=+1.680155$ | $d_5=0.08921$ | 1.57250 | 57.5 |
|  | $r_9=-1.644270$ | $l_3=0.10052$ |  |  |
| $L_{VI}$ | $r_{10}=-0.848156$ | $d_6=0.05036$ | 1.62299 | 58.1 |

$l_4$ designates the distance of the exit pupil of the attachment lens system from the last lens apex. This exit pupil must coincide with the entrance pupil of the photographic system arranged behind it.

We claim:

1. In an optical system the combination with a positive objective, of an afocal wide angle lens system for attaching on the front of said objective and causing a telescopic magnification reckoned in the direction of light smaller than unity, comprising a dispersive front lens group and a collective rear lens group separated from each other by an air space and consisting each of a first and of a second component each separated by an air space, all said four components being of meniscus shape, the components of said dispersive front lens group and the first component of the said collective rear lens group turning their convex sides towards the object, the second component of the said collective rear lens group turning its convex side towards the said objective, the first components in each of the said two lens group consisting of two lens elements of opposite refractive power cemented together, and the second components in each of the said two lens groups consisting each of a single lens element, in both said cemented lens components the front lens being dispersive, the radii of the cemented surfaces of each said cemented components turning their convex sides towards the object and being greater than 0.2 times but smaller than 0.6 times the focal length of the lens group to which they belong, and at least one dispersive lens in the dispersive front lens group and at least one collective lens in the collective rear lens group consisting of glass having the refractive index greater than 1.6 and the Abbe number greater than 50, the difference in refractive index of the lenses in each cemented lens component being greater than 0.02.

2. An afocal lens system for photographic objectives according to claim 1 characterized by the following values for the anterior radii of the individual components: first component of the first lens group: greater than 0.5 times but smaller than 0.9 times the focal length of the anterior lens group; second component of the first lens group: greater than 1.8 times but smaller than 3 times the focal length of the first lens group; first component of the second lens group: greater than 0.4 times but smaller than 0.7 times the focal length of the posterior lens group; second component of the second lens group: greater than the unit value but smaller than 1.8 times the focal length of the posterior lens group.

3. An afocal lens system for attaching to photographic objectives according to claim 1, the individual surface refractive powers ($\Delta n/r$) differing by a maximum of $\pm 0.5/f'$ and the thicknesses ($d$) and the air spaces ($l$) by a maximum of $\pm 0.05 \cdot f'$ ($f'$ in each case referred to the individual focal lengths of the front lens group) from the values given in the following numerical example:

| Lenses | Radii | Thickness and Separations | $n_d$ | $\nu_d$ | $\Delta n/r$ |
|---|---|---|---|---|---|
| $L_I$ | $r_1 = +0.688422 \cdot f$ | $d_1 = 0.09358 \cdot f$ | 1.65160 | 58.4 | $+0.9465124/f$ |
| $L_{II}$ | $r_2 = +0.413025 \cdot f$ | $d_2 = 0.12966 \cdot f$ | 1.59270 | 35.4 | $-0.1426063/f$ |
|  | $r_3 = +0.401308 \cdot f$ | $l_1 = 0.20103 \cdot f$ |  |  | $-1.4769204/f$ |
| $L_{III}$ | $r_4 = +2.305908 \cdot f$ | $d_3 = 0.05036 \cdot f$ | 1.62041 | 60.3 | $+0.2690523/f$ |
|  | $r_5 = +0.789274 \cdot f$ | $l_2 = 0.18200 \cdot f$ |  |  | $-0.7860514/f$ |
| $L_{IV}$ | $r_6 = +0.673711 \cdot f$ | $d_4 = 0.03846 \cdot f$ | 1.60717 | 40.2 | $+0.9012321/f$ |
| $L_V$ | $r_7 = +0.378866 \cdot f$ | $d_5 = 0.08921 \cdot f$ | 1.57250 | 57.5 | $-0.0915099/f$ |
|  | $r_8 = +1.680155 \cdot f$ | $l_3 = 0.10052 \cdot f$ |  |  | $-0.3407423/f$ |
| $L_{VI}$ | $r_9 = -1.644270 \cdot f$ | $d_6 = 0.05036 \cdot f$ | 1.62299 | 58.1 | $-0.3788854/f$ |
|  | $r_{10} = -0.848156 \cdot f$ |  |  |  | $+0.7345228/f$ |

References Cited in the file of this patent

UNITED STATES PATENTS

| | | |
|---|---|---|
| 1,934,561 | Rayton | Nov 7, 1933 |
| 2,184,018 | Ort | Dec. 19, 1939 |
| 2,317,790 | Mellor | Apr. 27, 1943 |
| 2,324,057 | Bennett | July 13, 1943 |
| 2,582,085 | Tolle | Jan. 8, 1952 |
| 2,612,077 | Albrecht | Sept. 30, 1952 |

FOREIGN PATENTS

| | | |
|---|---|---|
| 605,884 | France | Feb. 26, 1926 |
| 722,817 | France | Jan. 5, 1932 |